Sept. 18, 1951     W. B. MARTIN     2,568,019

TELEGRAPH SIGNAL BIASING SET

Filed March 5, 1949

INVENTOR
W. B. MARTIN
BY
ATTORNEY

Patented Sept. 18, 1951

2,568,019

UNITED STATES PATENT OFFICE 2,568,019

TELEGRAPH SIGNAL BIASING SET

Wade B. Martin, Ramsey, N. J., assignor to American Telephone and Telegraph Company, a corporation of New York Application March 5, 1949, Serial No. 79,819

9 Claims. (Cl. 178—69)

This invention relates to telegraph testing sets and particularly to testing sets arranged for introducing bias and end distortion into the test message signals.

In transmitting telegraph signals, each of which is made up of a plurality of impulses having a definite length, distortion of the impulses and therefore of the signals may be produced by various causes inherent in the telegraph circuit or in the apparatus connected thereto. The distortion or bias manifests itself in increasing or decreasing the duration of the marking impulses of the signals transmitted over a telegraph circuit. This undesirable distortion may be the result of irregularities in the travel time of the armatures of the relays in a telegraph circuit or may be due to irregularities in the transmission characteristic of a telegraph circuit or other conditions.

Four types of signal distortions will be referred to herein, namely marking bias, spacing bias, marking end distortion and spacing end distortion. Bias, of both types, frequently occurs in telegraph transmission systems, and generally affects all marking impulses alike and to the same extent. It is evidenced by advancement of the beginnings of all marking impulses relative to the beginning of the start impulse, in the case of marking bias, and by retardation of the beginnings of the marking impulses relative to the beginning of the start impulse in the case of spacing bias. In other words, marking bias is a condition of shorter-than-normal intervals between the mark-to-space transition which begins the start impulse and all space-to-mark transitions in the code combination, and spacing bias is a condition of longer-than-normal intervals between the mark-to-space start impulse transition and space-to-mark transitions of the code combination.

End distortion is an artificial simulation of types of distortion which occur in telegraph transmission systems, but it is not practical to produce for test purposes. These are "characteristic" distortions which may vary from impulse to impulse and are dependent on the sequence or combination of preceding impulses, and "fortuitous" distortions, which is non-repetitive and usually results from electrical disturbances of any of several kinds. End distortion affects the time of occurrence of the ends of marking impulses, which are mark-to-space transitions, relative to the mark-to-space start impulse transition. This differs from the marking and spacing bias which, as hereinbefore stated, affects the beginnings of the marking impulses. Like marking and spacing bias, respectively, marking end distortion is characterized by a lengthening of the marking intervals and spacing end distortion is characterized by a shortening of the intervals. Teletypewriter apparatus responds in generally the same manner to end distortion that it does to "characteristic" and "fortuitous" distortion, so that the tolerance of such apparatus to "characteristic" and "fortuitous" distortion may be tested by impressing upon it signals having end distortion.

This lengthening and shortening of transition intervals results in departure from the unity ratio of marking impulse length to spacing impulse length and may interfere with the proper reception of the signals. In a printing telegraph system, biasing of the signals may result in the printing of false characters. If the marking impulses are too short, some of them may not actuate their respective receiving elements thereby resulting in the printing of errors. Also, if the marking impulses are too long, they may improperly operate receiving elements corresponding to impulses intended to be spacing impulses which would also result in the printing of errors. Because of this possible distortion of the signal impulses, it is desirable to design and adjust receiving printing telegraph apparatus to correctly receive impulses having as great a degree of bias or end distortion as possible, such as forty per cent marking or forty per cent spacing.

The object of this invention is, therefore, to provide improved means for transmitting to apparatus to be tested, impulses affected with various degrees of marking bias, spacing bias, marking end distortion or spacing end distortion, and to quickly change from one to another.

The use of what is here defined as marking and spacing bias for testing teletypewriters will show up errors in adjustments and inaccuracies in the manufacture of parts. However, teletypewriters which are apparently satisfactory from the standpoint of this type of distortion, that is, bias, will still be not wholly satisfactory until tested and adjusted under conditions caused by that other type of distortion known as end distortion. In other words, it is known that teletypewriters respond somewhat differently to the lengthening or shortening of the marking selecting impulses when the beginning of the impulse is affected than when the end of the impulse is affected. Hence, it is necessary, in order to fully test a teletypewriter, to subject it to both marking and spacing bias and marking and spacing end distortion.

Heretofore when introducing known amounts of bias and distortion electromagnetic relays and special distributors were used for this purpose whereby signals having known amounts of such bias and distortion could be generated for testing teletypewriter apparatus.

According to the present invention a signal biasing set is provided wherein a vacuum tube is used for subjecting standard or perfect signals to any desired amount of bias and distortion and repeating such signals into the winding of an output electromagnetic relay. The circuit elements are always brought to the same electrical condition at the start or end of each cycle of operation so that characteristic distortion is not superimposed on the intentionally produced distortions, and inasmuch as the vacuum tube is always under control of its circuit elements and the resulting currents controlling the output electromagnetic relay are of substantially square-topped wave form, the major causes of fortuitous distortion are eliminated. The present invention produces marking bias, spacing bias, marking end distortion and spacing end distortion.

A feature of the invention is to provide a test set having means whereby the output signals produced therein are stable and therefore satisfactory for making stability tests.

Another feature is the provision of means for holding to a minimum the characteristic and fortuitous distortion in the output signals.

Another feature is the provision of means which when adjusted for a given bias, using an effective polar output, will also serve for ordinary neutral, inverse neutral, or true polar transmission.

Another feature is the substitution of vacuum tubes for the electromagnetic relays, distributors and other electromechanical devices inherently having inertia characteristics for generating signals having the desired amount of bias or distortion and then repeating them into an output electromagnetic relay.

Another feature is the provision of means for causing the marking bias, spacing bias, marking end distortion and spacing end distortion of a predetermined value to occur in the output signals.

Other objects and features of the invention will appear from a study of the following specification, claims and appended drawing.

Figure 1 shows a schematic circuit arrangement of a signal biasing test set wherein a vacuum tube circuit is arranged to impose various kinds of bias or distortion on substantially perfect teletypewriter signals whereby the signals so modified have the desired amount of bias or distortion, for testing teletypewriter apparatus; and Fig. 2 illustrates a series of charts showing the operation of a distorting circuit and an output electromagnetic relay, when teletypewriter signals have known amounts of bias or distortion of various kinds superimposed on them by the distorting circuit.

*General description*

Reference will now be made to Fig. 1 of the drawing.

The circuit schematic shown in Fig. 1 comprises input electromagnetic relay 11 and output electromagnetic relay 12 interconnected by two vacuum tubes, one being a twin-diode vacuum tube rectifier 13 and the other an amplifier vacuum tube 14 having its output circuit connected to the operating winding of output relay 12.

Input relay 11 has two windings. Its operating or upper winding is connected to one or multiple jacks in the face of a test board and is arranged to receive test signals of a neutral type, that is, open and closed circuit conditions, that are automatically transmitted from a test sentence tape moving through tape transmitter 15. Its biasing or lower winding is arranged for connection on one side to a source of potential and on the other side to a grounded adjustable resistor 16 whereby the biasing current may be calibrated.

A signal distorting circuit comprises condenser 18, rheostat 17, twin-diode vacuum tube 13 and vibrating relay 19, the latter being under control of manually operated switch 20. Switch 20 controls relay 19 to change the connections of vacuum tube 13 to determine the type of bias or distortion that is to be impressed on signals repeated by relay 11 for testing purposes in the output circuit. It conditions vacuum tube 13 for operation in response to polar signals repeated by the input relay.

The armature of input relay 11 in response to the incoming signal impulses operates between marking and spacing contacts respectively connected to grounded positive and grounded negative batteries, say of 130 volts each, and is connected to conductor 21 which in turn is connected to rheostat 17 and conductor 22, in parallel. The resistance of rheostat 17 may be varied from substantially zero to about 75,000 ohms. The rheostat 17 at its opposite end is connected to three parallel paths, one extending through resistor 23 and condenser 18, in series, to ground, resistor 23 having a resistance value of about 2,000 ohms, the second extending to cathode 24 of the right-hand diode of vacuum tube 13 and to plate 25 of the left-hand diode of vacuum tube 13, and the third extending through resistor 26, to grid 27 of vacuum tube 14, resistor 23 having a high resistance value of the order of 2 megohms. Conductor 22 extends to the armature of vibrating relay 19, the armature of the vibrating relay being operable between contacts respectively connected to plate 29 of the right-hand diode of vacuum tube 13 and cathode 30 of the left-hand diode.

Amplifier vacuum tube 14 which receives the biased and distorted signals from the signal biasing circuit and repeats them as a substantially square-topped wave form into the operating or upper winding of output relay 12, has its cathode 31 connected to the adjustable contact of potentiometer 32. By means of potentiometer 32 the grid-cathode biasing voltage may be adjusted to cause vacuum tube 14 to become conductive at a predetermined amplitude of the input signaling current received from the biasing circuit.

Output relay 12 operates in response to current flowing in the plate circuit of vacuum tube 14 to repeat the biased and distorted signals as polar, effective polar, inverse neutral or ordinary neutral signals to the output circuit, as desired. A circuit wherein transmission is on a polar basis, has grounded positive and grounded negative batteries, generally of equal potentials, arranged for alternate connections to itself, the opposite end of the circuit being connected directly to ground. A circuit wherein transmission is on an effective polar basis is substantially identical with a circuit arranged on a regular polar basis except that it does not terminate in a direct ground but in a grounded positive or a grounded negative current source of approximately the same potential as the corresponding one of the two sources at the originating end, in the circuit shown for transmitting effective polar signals the terminating end is connected to a grounded positive current source. A circuit wherein transmission is on an inverse neutral basis provides for current to flow during the spacing condition rather than during the marking condition as in ordinary neutral transmission. The output circuit shown in Fig. 1 may be arranged for connection for any one of several different kinds of signaling such as (1) a circuit 33 for a teletypewriter or other device designed to receive polar or polar effective signals, (2) a multiway repeater circuit 34 adapted to receive inverse neutral signals, and (3) a circuit 35 wherein ordinary neutral signals are used. These different kinds of transmission circuits may be selected, as desired, by means of manually operable switch 36 which is shown in the drawing as having three simultaneously rotatable arms, each arranged to be stepped over its respective contact bank to engage any one of its four contacts. When the switch arms are in engagement with their respective first contacts, reading from left to right, polar signals are transmitted over the output circuit; second contacts, effective polar signals are transmitted; third contacts, inverse neutral signals are transmitted; and fourth contacts, ordinary neutral signals are transmitted. The current for the signals transmitted on an inverse neutral basis is furnished from the source of negative potential connected to each of the repeaters as indicated in the multiway repeater circuit 34, and the current for signals transmitted on an ordinary neutral basis is furnished from the source of positive and negative potentials connected to circuit 35.

*Detailed description*

Figure 1:
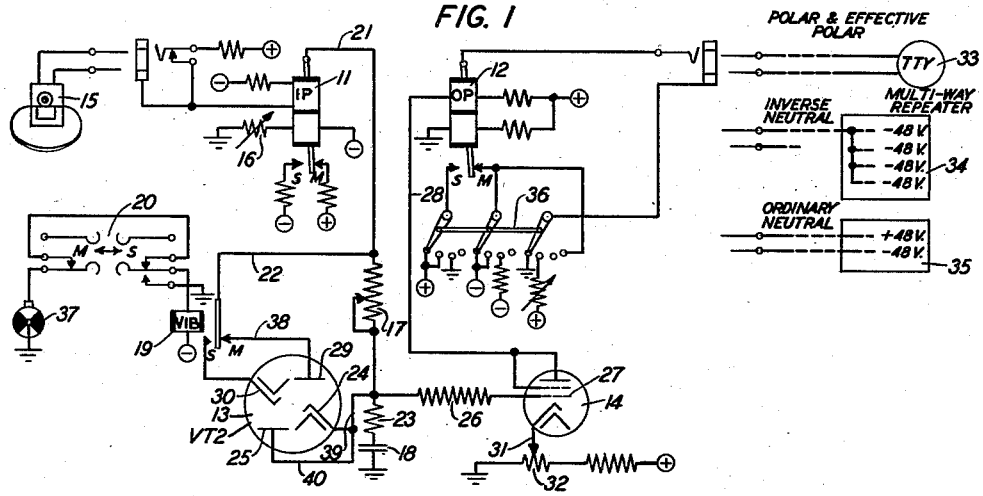
Figure 2:
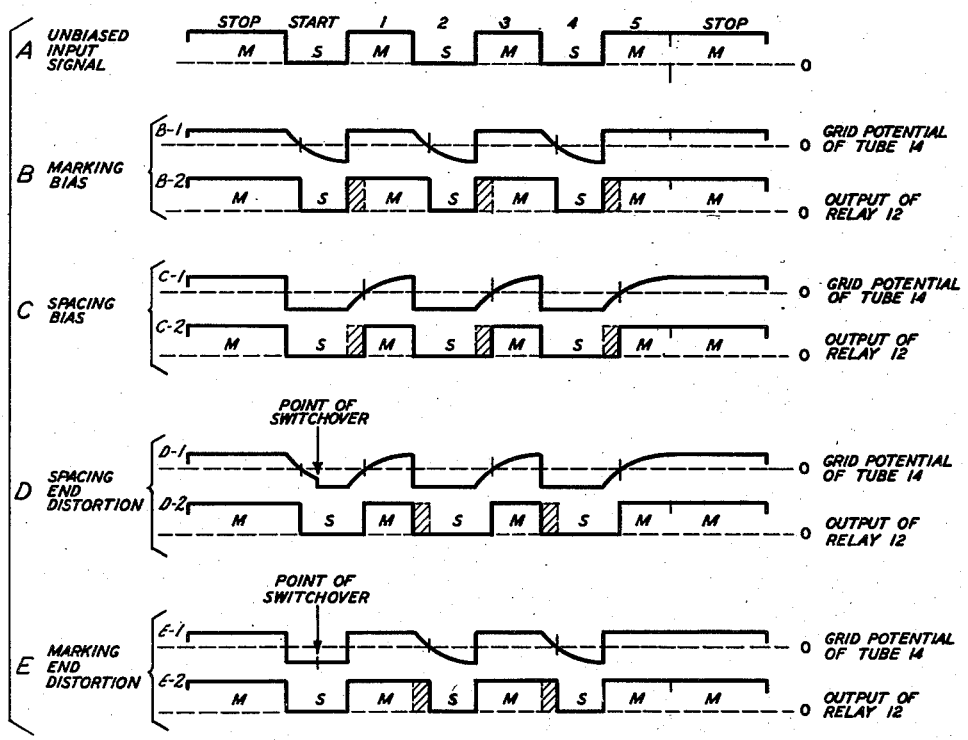

The method of operation will be described, in detail with reference to charts A, B, C, D and E of Fig. 2. In operation, unbiased teletypewriter signals are transmitted from tape transmitter 15, into the operating winding of input relay 11. An unbiased teletypewriter signal corresponding to letter Y is shown in chart A of Fig. 2. Input relay 11, upon operating in response to the impulses of signal character Y, connects 130 volts grounded negative battery for the spacing impulses which in the signal for letter Y, are the start impulse and selecting impulses Nos. 2 and 4, and 130-volt grounded positive battery for the marking impulses which in the signal for letter Y, are selecting Nos. 1, 3 and 5 and the stop impulse. The impulses repeated by input relay 11 are transmitted over conductor 21 into the biasing circuit wherein they are biased in a manner as indicated in the graphs B—1, C—1, D—1 and E—1 of Charts B, C, D and E, the type of bias or distortion impressed on the signals repeated by input relay 11 being determined by the position to which manually operable switch 20 may be selectively operated. Vibrating relay 19 is connected over the normally closed contacts of switch 20 to a current interrupter 37 for continuously operating and releasing the relay. In this manner, the source of negative potential connected to the winding of vibrating relay 19 is connected to ground through the alternate conducting and non-conducting sections of interrupter 37 thereby alternately energizing and deenergizing vibrating relay 19 which thereby vibrates at a uniform frequency. The rate of these vibrations may be such as to produce any desired number of impulses per minute. By operating key 20 to its right-hand position vibrating relay 19 will be continuously operated to hold relay 19 in its operated position whereby cathode 30 is held connected to conductor 22 and the left-hand diode of vacuum tube 13 is maintained effective to produce spacing bias in the incoming signals, and the right-hand position of the key has been designated S. By operating key 20 to its left-hand position, relay 19 will be continuously deenergized and plate 29 will therefore be held connected to conductor 22 and the right-hand diode of vacuum tube 13 is maintained effective to produce a marking bias of the incoming signals. With this arrangement of switch 20 and vibrating relay 19 there may be produced in the biasing circuit signals having only a marking bias, or a spacing bias, a marking end distortion or a spacing end distortion, as desired. This bias and distortion are accomplished by distorted signal waves of the forms shown in graphs B—1, C—1, D—1 and E—1, the zero or ground potential value in each graph being indicated as a dash line. The voltage of these distorted waves are impressed on the grid of vacuum tube 14 and only those voltages at or above the zero value are effective to make vacuum tube 14 conductive. The output of vacuum tube 14 flows through the operating or upper winding of relay 12 and the resultant wave produced by relay 12 is of a square-topped form shown in each of graphs B—2, C—2, D—2 and E—2. The duration of each impulse produced by relay 12 is equal to that of the voltage amplitude above or below the zero line of its corresponding impulse in its respective graph of graphs B—1, C—1, D—1 and E—1.

Before the start impulse of the signal shown in chart A is received in the operating winding of input relay 11, 130-volt positive battery is connected in a circuit traceable over the marking or right-hand contact and armature of relay 11, conductor 21, bias rheostat or adjustable resistor 17, resistor 23 which is preferably fixed, condenser 18 to ground, and the condenser, which has a capacity of about ⅛ microfarad, is charged to a positive voltage approaching 130 volts. A path parallel to the condenser charging path is traceable over conductor 22 to the armature of vibrating relay 19, the armature being movable between its associated marking bias or right-hand contact and spacing bias or left-hand contact whereby either of the twin diodes of vacuum tube 13, depending on the position of the relay armature, is made conducting or non-conducting during the charging and discharging of condenser 18, depending on the polarity of the potential. Vibrating relay 19 may be maintained in either an operated or a released position or may be made to alternately operate and release in uniform cycles, say one or two cycles per second, depending on the position to which the switch 20 is operated. Switch 20 in the position shown connects interrupter 37 to the operating circuit of relay 19 whereby the relay alternates automatically between its operated and released positions in uniform cycles. When switch 20 is operated to its left-hand position, relay 19 is maintained in its released position and when operated to its right-hand position the relay is maintained in its operated position. Switch 20, by being operated to any of its three positions, causes by means of vibrating relay 19, connections to the twin diodes of vacuum tube 13 to be changed as desired whereby either diode may be made conducting while the other diode is non-conducting or the diodes may be made alternately conductive in uniform cycles. By changing the conducting state of the diode as desired, predetermined changes in the bias sign of the incoming signals are made.

With positive potential being impressed over conductor 21 onto condenser 18 and vibrating relay 19 being in its released or right-hand position as shown, this potential has no effect on the left-hand diode of vacuum tube 13 because the plate-cathode circuit of the left-hand diode is open at the front contact of vibrating relay 19 and the left-hand diode is at this time non-conducting. Assuming that condenser 18 has become fully charged, there will be no current flow through rheostat 17 and no voltage across it, so that the anode and cathode of the right-hand diode of tube 13 will be at the same potential and the diode will not be conducting. The fully charged potential of condenser 18 will be impressed on the input circuit of tube 14 with positive polarity applied through grid resistor 26, which may have a value of the order of 2 megohms, to the grid of tube 14. Therefore, vacuum tube 14 is normally conducting plate current to flow through the operating, or upper, winding of output relay 12, over conductor 28 through vacuum tube 14, to potentiometer 32. The output relay 12 is held in its marking or right-hand position to normally maintain teletypewriter 33 in the stop or rest condition, or multiway repeater 34 in an idle condition or a telegraph circuit 35 operated by ordinary neutral signals, closed during idle periods between transmitted messages.

When the start impulse of a signal such as that of the signal wave shown in chart A is received in the operating winding of input relay 11, the relay armature moves from its marking or right-hand contact to its spacing or left-hand contact.

Continuous marking bias

Assuming that switch 20 is in its left-hand position and vibrating relay 19 is therefore in its released or right-hand position, the left-hand diode of vacuum tube 13 may, under such conditions, be ignored because at this time its plate-cathode circuit is maintained open at the front contact and armature of relay 19 as hereinbefore described. When the armature of input relay 11 reaches its spacing or left-hand contact the positive potential stored on condenser 18 discharges in a path extending over resistor 23, bias rheostat 17, conductor 21, armature and spacing contact of input relay 11, to grounded negative battery of 130 volts. The current which charges condenser 18 to a negative potential when the incoming signals are being given marking bias flows through bias rheostat 17 and causes plate 29 of the right-hand diode to become negative with respect to its cathode 24 and no current flows in vacuum tube 13. When no current flows in the right-hand diode in response to the negative current at this time, condenser 18 discharges its positive potential and recharges to a negative potential, with delay, that is, very slowly, as indicated during the start impulse shown in graph B—1 of chart B of Fig. 2.

Condenser 18 charges exponentially, its rate of charging depending on the resistance adjustment of bias rheostat 17. Because of this resistance adjustment and the high resistance value of resistor 26, the change of grid bias in vacuum tube 14 due to the reversal from positive to negative of the potential charge on condenser 18 is also delayed when the incoming signal transition during marking bias operation is from mark to space. This change in grid bias from positive to negative is substantially identical with that indicated for the start impulses shown in graph B—1 of chart B. After the delay, the magnitude of which is dependent on the adjustment of bias rheostat 17, the sweep of the voltage wave crosses the zero value between the positive voltage for marking and the negative voltage for spacing. The point of crossing during the start impulse is indicated in graph B—1 as being approximately 25 per cent from the beginning of the start impulse to represent a case where the margin of bias desired is 25 per cent. When the sweep of the wave crosses the zero value to negative voltage, vacuum tube 14 becomes non-conducting and the output relay 12 operates to its spacing or right-hand position under the influence of the biasing current flowing through the lower winding of relay 12, to transmit to the output circuit a delayed start or space impulse. Only a small portion of the sweep from positive to negative voltage during the transition from marking to spacing is required to change vacuum tube 14 from its state of being fully conducting to its cut-off voltage, and therefore the current in the plate circuit of vacuum tube 14 approaches a square-topped wave form. The beginning of the start impulse as repeated by output relay 12 and shown in graph B—2 is a mark-to-space transition and is shown delayed with respect to the beginning of the start impulse of the unbiased signal shown in chart A.

On the next space-to-mark transition of the signal wave which in chart A is shown between the start impulse and selecting impulse No. 1, the armature of input relay 11 moves back to its mark or right-hand contact thereby again connecting the grounded 130-volt positive battery to discharge and recharge condenser 18 through the parallel paths comprising bias rheostat 17 and the right-hand diode of vacuum tube 13. The right-hand diode of vacuum tube 13 becomes conductive and effectively short-circuits bias rheostat 17. This right-hand diode is highly conductive and responds to the positive potential received at a space-to-mark transition of the incoming signal. In response to the space-to-mark transition, when bias rheostat 17 is short-circuited, condenser 18 discharges almost instantly through the diode to change the grid bias of vacuum tube 14 without delay, from a negative bias to a positive bias, and vacuum tube 14 becomes conducting instantly to transmit plate current to the operating or upper winding of output relay 12. Relay 12 operates immediately to transmit a mark impulse to the output circuit. The rapid change in the grid bias of vacuum tube 14 has the configuration of a substantially vertical wave front as shown at the beginning of selection impulse No. 1 of graph B—1. Likewise, the output of relay 12 produces a vertical wave front for the corresponding marking impulse transmitted to the output circuit as shown in graph B—2. The subsequent transitions of the remaining impulses of the incoming signal shown in chart A, such as mark-to-space at the beginning of selecting impulse No. 2, space-to-mark at the beginning of selecting impulse No. 3, mark-to-space at the beginning of selecting impulse No. 4, and space-to-mark at the beginning of selecting impulse No. 5 change the bias on the grid of vacuum tube 14 in a manner similar to that hereinbefore described for the markto-space transition of the beginning of the start impulse or the space-to-mark transition at the beginning of the selecting impulse No. 1. These changes in grid bias of vacuum tube 14 are similar in form to the wave shown in graph B—1, the mark-to-space transition changing the grid bias gradually and the space-to-mark transitions changing the grid bias rapidly. Accordingly, the plate current wave of vacuum tube 14, upon flowing through the operating winding of relay 12, produces in the output circuit of relay 12 a square-topped signal wave form having its space-to-mark transitions advanced with respect to the beginning of its start impulse as shown in graph B—2 which is the characteristic of signals having a marking bias. The amount of advancement of the space-to-mark transitions with respect to the beginning of the start impulse is indicated by the shaded portions of graph B—2.

In view of the above it will be noted that when the incoming signals are continuously biased to marking, the transitions in the signal wave from marking to spacing, cause a discharge of condenser 18, with delay, and the transitions from spacing to marking cause a discharge of condenser 18, without delay, as shown in graph B—1.

It is apparent from an inspection of graph B—2 that the signal represented thereby has all of its mark-to-space transitions including the beginning of the start impulse, delayed with respect to the corresponding transitions of the signal in graph A. It is well understood that start-stop signal responsive devices, such as teletypewriters, take no cognizance of delay in start impulses since such delay merely amounts to elongation of the stop impulse, during which the receiving selector is at rest. The selector is set in operation by the start transition, and accordingly the start transition is the reference transition in so far as the times of reception of subsequent transitions are concerned. Thus it is that although the signal represented by graph B—2 has its transitions related to those of the signal represented by graph A as stated hereinbefore, namely, with all mark-to-space transitions delayed, a receiving teletypewriter would interpret the signal as having its space-to-mark transitions advanced relative the beginning of the start impulse, which, by definition, is marking bias. In order that the signal represented by graph B—2 may be viewed as it would appear to a receiving teletypewriter, it should be imagined that the graph is shifted leftwardly until the beginning of the start impulse is aligned with that in graph A. The relation of the biased signal to an unbiased signal will at once be apparent. Graph B—2 was drawn as it appears in Fig. 2 rather than shifted to the left, because its transitions are related to graph B—1 in the manner hereinbefore stated.

*Continuous spacing bias*

Assuming that switch 20 is in its right-hand position and vibrating relay 19 is therefore in its operated or left-hand position, cathode 30 of the left-hand diode of vacuum tube 13, instead of plate 29 of the right-hand diode, is connected to conductor 22. The cathode 30 is at the same potential as its plate 25 when condenser 18 is fully charged and consequently the left-hand diode is non-conducting during the idle periods of the system. The right-hand diode of vacuum tube 13 may be ignored when the system is adjusted for spacing bias because at this time its plate-cathode circuit is maintained open at the back contact and armature of relay 19.

When the start impulse of the signal such as that of the signal wave shown in chart A, is received in the operating winding of input relay 11, the relay armature moves from its marking or right-hand contact to its spacing or left-hand contact. When the armature of input relay 11 reaches its spacing contact the positive potential stored on condenser 18 discharges in a path extending over resistor 23, conductors 39 and 40, plate 25, cathode 30, spacing bias contact and armature of relay 19, conductors 22 and 21, armature and spacing contact of input relay 11, to grounded negative 130-volt battery. Vacuum tube 13 is highly conductive, and since at this time plate 25 is positive in relation to its cathode 30, offering a low resistance path in parallel to bias rheostat 17, condenser 18 discharges rapidly, causing a vertical mark-to-space transition in the grid circuit of vacuum tube 14 as indicated at the beginning of the start impulse shown in graph C—1 of chart C. The discharge of the positive potential on condenser 18, without delay, biases the grid of vacuum tube 14 negatively and thereby causes vacuum tube 14 to become non-conducting, without delay, to cause the release of output relay 12 instantly. Therefore, the mark-to-space transition at the beginning of the start impulse is transmitted to the output circuit, without delay. However, after condenser 18 discharges its positive potential and becomes charged to a negative potential approaching 130 volts, the left-hand diode of vacuum tube 13 becomes non-conducting and vacuum tube 14 remains non-conducting as long as a negative potential is stored on condenser 18. During the reception of the start impulse, when vacuum tube 14 is non-conducting, the armature of output relay 12 is maintained in engagement with its spacing or left-hand contact under the influence of the biasing current in the lower winding of the relay. A square-topped space or start impulse is thus transmitted to the output circuit as shown in graph C—2 of chart C.

Inasmuch as the next incoming impulse which is selecting impulse No. 1, is a mark, as shown in chart A, the transition at the end of the start impulse is space-to-mark, whereby input relay 11 is operated back to its marking or right-hand contact. When the armature of relay 11 engages its marking contact the discharge path of condenser 18 is closed over the parallel paths, one including bias rheostat 17 and the other including the left-hand diode of tube 13. At this time the cathode 30 is positive in relation to its plate 25 and therefore the left-hand diode of vacuum tube 13 offers a very high impedance to the discharge current which now is limited by the resistance of bias rheostat 17. Accordingly, a delay occurs between the time the armature of relay 11 engages its marking contact and the grid of vacuum tube 14 becomes biased positively. A delayed plate current, therefore, flows in vacuum tube 14 to operate output relay 12 to its marking or right-hand position whereby a marking impulse delayed with respect to the beginning of the start impulse, is transmitted to the output circuit. The shaded portion at the beginning of selecting impulse No. 1 in graph C—2 indicates the delay of the occurrence of the marking impulse and represents the spacing bias whereby the start or space impulse is elongated.

In view of the above it will be noted that when the incoming signals are continuously biased to spacing the transitions in the signal wave from marking to spacing cause a discharge of condenser 18 without delay, and the transitions from spacing to marking cause a discharge of condenser 18 with delay, as shown in graph C—2.

When the biasing circuit is adjusted for marking bias, all space-to-mark transitions of the selecting impulses with respect to the beginning of the start impulse are advanced, as shown by shaded portions in graph B—2. When the biasing circuit is adjusted for spacing bias all space-to-mark transitions of the selecting impulses with respect to the beginning of the start impulse are delayed, shown as shaded portions in graph C—2.

The rheostat 17, being variable, permits varying the charging and discharging rate of condenser 18. Varying the charging and discharging rate correspondingly varies the interval between transitions of relay 11 and the swinging of the grid of tube 14 up or down across the cut-off potential. The effect of this is to vary the degree or percentage of bias, which is desirable when testing the tolerance of teletypewriter receiving devices to distorted signals.

End distortion

Assuming that switch 20 is in its normal position, as shown, vibrating relay 19 is therefore continuously vibrating and releasing in uniform cycles to render the twin diodes alternatively effective to subject the incoming signals to spacing bias and marking bias depending on which of the diodes is effective at the time the signal is received. Switching from one type of bias to the other during the reception of a code combination has the effect of subjecting subsequently received impulses of that code combination to marking or spacing end distortion, depending upon which way the reversal occurs.

Spacing end distortion

When the biasing circuit is arranged for end distortion, the armature or relay 19 is vibrating between its front and back contacts and each movement of the relay armature from its back to its front contact or vice versa, accordingly produces a switchover from mark-to-space or space-to-mark bias. When the relay armature is in engagement with its back contact, the right-hand diode is effective to bias the incoming signal marking and when the armature is in engagement with its front contact the left-hand diode is effective to bias the incoming signal spacing. If the switch-over occurs at or after the middle of the start impulse is received, subsequent impulses preceding the stop impulse of the incoming signal contain end distortion, otherwise the entire signal has either continuous mark or continuous space bias.

In graph D—1 of chart D the grid of tube 14 is shown as initially responding to a signal with marking bias produced when the right-hand diode is effective as a result of engagement of the armature of relay 19 with its back contact. At about the middle of the start impulse graph D—1 shows a point of switch-over caused by the relay armature moving into engagement with its front contact whereby the incoming signals are subjected to spacing bias. When relay 19 operates its armature to its front contact whereby the right-hand diode of vacuum tube 13 is disconnected and the left-hand diode becomes effective, condenser 18 which at the time was slowly discharging, immediately became completely discharged, and then became fully charged to the opposite, or negative, potential. The negative potential remains stored on condenser 18 for the duration of the start impulse. When the space-to-mark transition occurs at the beginning of selecting pulse No. 1, and the armature of relay 11 moves into engagement with its marking or right-hand contact, condenser 18 begins to discharge its negative potential slowly and when fully discharged it stores a charge of positive potential in the same manner as when the biasing circuit had a steady spacing bias as shown in graph C—1. The mark-to-space transition at the end of selecting impulse No. 1, the space-to-mark transition at the end of selecting impulse No. 2, the mark-to-space transition at the end of selecting impulse No. 3, and the space-to-mark transition at the end of selecting impulse No. 4 produce a voltage wave on the grid of vacuum tube 14 which is similar to that shown in graph C—1. In this voltage wave the first mark-to-space transition, which occurs at the beginning of the start impulse, is delayed, but all subsequent mark-to-space transitions before the next switchover occurs are not delayed. The space-to-mark transitions in the wave form shown in graph D—2 are delayed with respect to the corresponding transitions in undistorted signal, graph A. With the space-to-mark transitions delayed and the mark-to-space transitions not delayed (except the start transition which is delayed) it follows that the space-to-mark transitions (beginnings of marking impulses) are neither advanced nor delayed with respect to the beginning of the start impulse, and that the mark-to-space transitions (ends of marking impulses) have a time relationship of advancement with reference to the beginning of the start impulse. By definition, this is spacing end distortion.

As in the case of the marking bias, the relation of the signal represented by graph D—2 to an undistorted signal, from the standpoint of a receiving device, may be seen by imagining that graph D—2 is shifted leftwardly until the beginning of the start impulse is aligned with that of graph A. When this is done it will be apparent that the ends of the marking impulses have been advanced, relative to the beginning of the start impulse, to the extent of the shaded areas, which are parts of the succeeding spacing impulses.

Marking end distortion

When the biasing circuit is in the spacing bias condition just prior to the time of switch-over, the armature of relay 19 is in engagement with its front contact and the left-hand diode of vacuum tube 13 is effective to apply spacing bias to the incoming signal. Accordingly, the start impulse transition of the incoming signal occurs without delay as shown in graphs E—1 and E—2. When the armature of relay 19 moves into engagement with its back contact, the left-hand diode of vacuum tube 13 is disconnected and the right-hand diode becomes effective to apply marking bias to the incoming signal. Graph E—1 up to the point of switch-over which is assumed to occur in the middle of the start impulse is identical with graph C—1 but after the point of switch-over graph E—1 becomes identical with that of graph B—1. Accordingly, the potential applied to the grid of amplifier vacuum tube 14 causes relay 12 to produce in its output circuit a square-topped signal wave form having its mark-to-space transitions delayed with respect to the beginning of the start impulses, as shown in graph E—2. The mark-to-space transitions when delayed with respect to the beginning of the start impulse represent marking end distortion.

In view of the above it will be noted that when the biasing circuit is arranged for continuous marking or continuous spacing bias, the space-to-mark transitions are affected as shown in graphs B—2 and C—2, respectively, and when it is arranged for spacing end distortion or marking end distortion, the mark-to-space transitions are affected as shown in graphs D—2 and E—2, respectively.

The point of bias switching to produce end distortion has been indicated in graphs D and E as occurring about the middle of the start impulse. Unless interrupter 37 is synchronized with the transmitter output relay 12 it may not always occur in the middle of the start impulse, and it need not be arranged to occur at that time. The interrupter may be synchronized with the transmitter, to cause a switch-over during the start impulse of every code combination, or every second or third or fourth code combination as desired. On the other hand, the switch-over may be permitted to occur at random. In that event, mark-to-space transitions occurring after the switch-over will have marking or spacing end distortion as the case may be, and space-to-mark transitions preceding the switch-over will have spacing or marking bias.

The biasing circuit employed herein includes a twin-diode vacuum tube 13 having its diode sections alternately connectable in the circuit on a reversal basis, but it will be understood that a single diode vacuum tube may be equally well adapted for purposes of the invention to operate with vibrating relay 19. In a biasing circuit equipped with one diode vacuum tube only, relay 19 may be provided with two armatures operable between front and back contacts and connected in the well-known arrangement of a double-pole, double-throw reversing switch, to connect the single diode in one direction or the other across rheostat 17.

The values used herein are for illustrative purposes only and may be varied as desired to produce results that are within the scope of the invention.

What is claimed is:

1. A telegraph signal reproducing system comprising receiving relay means for repeating the marking and spacing impulses of incoming signal combinations, a source of polar signals controlled by said receiving relay means whereby the incoming signal impulses are repeated as polar signal impulses, a single path comprising adjustable impedance means for transmitting said polar signal impulses of positive and negative currents respectively, electron discharge means arranged to become alternately conducting and non-conducting in response to said positive and negative currents, respectively, transmitted over said single path, and potential storing means connected in series with said adjustable means for producing in accordance with the adjustment of said impedance means any predetermined amount of bias or distortion, as desired, at either end of one or more impulses in each of said signal combinations.

2. A telegraph signal reproducing system comprising receiving relay means for repeating the marking and spacing impulses of incoming signals, a source of polar signals controlled by said receiving relay means whereby the incoming signal impulses are repeated as polar signal impulses, a path comprising adjustable impedance means for transmitting said polar signal impulses, electronic means and selectively operable means therefor for conditioning said electronic means to be alternately conducting and non-conducting in uniform or non-uniform cycles, as desired, in response to the polar signal impulses transmitted over said path, potential storing means associated with said adjustable impedance means for producing any predetermined amount of bias or distortion, as desired, other repeating means operative in response to said biased or distorted signals and other selectively operable means for translating the output of said repeating means into signal impulses of the polar, effective polar, inverse neutral or ordinary neutral type.

3. A telegraph signal reproducing system comprising receiving relay means for repeating marking impulses and spacing impulses, a source of polar signals controlled by said relay means, an output path for transmitting the polar signal impulses from said source, said path comprising an adjustable resistor, a fixed resistor and a potential storing element connected in series, electronic means connected across said adjustable resistor, electromagnetic means and manually operable means therefor for conditioning said electronic means to become conducting and non-conducting alternately in response to the polar signal impulses received by said potential storing element over said path to produce any predetermined amount of bias or distortion, as desired, for testing telegraph circuits and apparatus.

4. A telegraph signal reproducing system comprising means for repeating marking current impulses and spacing current impulses of incoming signal combinations, a circuit comprising, in series connection, an adjustable impedance element, a fixed impedance element and a potential storing element, electron discharge means controlled by said circuit for (1) uniformly lengthening at the front ends one or more marking impulses only of each incoming signal combination, (2) uniformly shortening at the front ends one or more marking impulses only of each incoming signal combination, (3) uniformly lengthening at the rear ends one or more marking impulses of each incoming signal combination, and (4) uniformly shortening at the rear ends one or more marking impulses only of each incoming signal; switching means for selecting, as desired, the repeated signal combinations having their marking impulses only (1) lengthened at the front end, (2) shortened at the front end, and (3) alternately lengthened and shortened at their rear ends only, the last-mentioned selection being alternate with respect to signal combinations whereby the marking impulses of one signal combination are lengthened at their rear ends only and those of the following signal combination are shortened at their rear ends only, and means for causing said alternations to occur preferably during the latter half of the start impulse of each signal combination.

5. A telegraph signal reproducing system comprising receiving relay means for repeating marking current impulses and spacing current impulses, a bias adjusting circuit comprising potential storing means common to both marking current impulses and spacing current impulses repeated by said receiving relay means, and electronic means cooperating with said bias adjusting circuit for predetermining, as desired, the amount said repeated marking impulses and said repeated spacing impulses may be biased, other electronic means for amplifying said biased marking and biased spacing impulses, an output circuit, and other repeating relay means therein for repeating said biased impulses received from said amplifying means.

6. A telegraph signal reproducing system comprising receiving relay means for repeating marking current impulses and spacing current impulses of incoming signal combinations, a circuit connected to said receiving relay means and comprising, in series connection, adjustable impedance means and potential storing means, selecting means comprising a manually operable device, electron discharge means including said circuit and jointly controlled by said potential storing means and said manually operable device for continuously producing at one end of each of the repeated marking impulses only or of each of the repeated spacing impulses only of each of said signal combinations a predetermined amount of bias, as desired, or producing at one end of each of the repeated marking impulses only of each alternate incoming signal combination and of the repeated spacing impulses only of each of the other alternate incoming signal combinations any predetermined amount of distortion, as desired.

7. In a telegraph system, an instrumentality for testing the adjustment of receiving telegraph apparatus to receive signals affected by bias and distortion whereby an incoming message may be correctly recorded, said instrumentality comprising in combination, receiving relay means for producing undistorted marking current impulses and spacing current impulses of incoming signal combinations, rectifying means and an impedance network cooperating therewith, adapted to respond to said marking current impulses only and said spacing current impulses only, under different conditions, means for selecting said rectifying means (1) under one condition to lengthen at one end only the marking impulses of each incoming signal combination to produce marking bias, (2) under another condition to shorten at one end the marking impulses only of each incoming signal combination to produce spacing bias, and (3) under still another condition to automatically effect at recurring intervals a switch-over from marking bias to spacing bias and vice versa whereby groups of said signal impulses with marking end distortion and groups of said signal impulses with spacing end distortion are alternately produced, the impulses having distortion at one end only, and means in said impedance network for predetermining any desired amount of marking or spacing bias or marking end or spacing end distortion to which the impulses repeated by said receiving relay means will be subjected.

8. In a telegraph system, an instrumentality for testing the adjustment of receiving telegraph apparatus to correctly receive signals affected by bias and distortion, said instrumentality comprising a combination receiving relay means for providing marking current impulses and spacing current impulses, rectifying means and an impedance network cooperating therewith, adapted to respond to said marking current impulses and said spacing current impulses under different conditions, means for selecting (1) one of said rectifying means under one condition to lengthen the marking impulse only to produce marking bias, (2) the other of said rectifying means under another of said conditions to shorten the marking impulses only to produce spacing bias, and (3) both of said rectifying means alternately under another of said conditions to automatically effect at recurring intervals switch-overs from marking bias to spacing bias and vice versa, sources of potentials, and means for selecting the proper ones of said sources to cause the impulses passing through said rectifying means and said impedance network to be repeated as signals of the polar, effective polar, ordinary neutral or inverse neutral type.

9. A bias transmitter for telegraph signals comprising a source of unbiased signals, a condenser adapted to be charged according to a polarity characteristic of the marking or spacing nature of said signals, signal repeating means controlled by the charge on said condenser, a rheostat connected in series with said condenser for retarding the charging of said condenser and correspondingly retarding signal responsive operation of said repeating means, and polarity sensitive electron discharge means for by-passing condenser charging current around said rheostat to eliminate retardation of certain signals.

WADE B. MARTIN.

REFERENCES CITED

The following references are of record in the file of this patent:

UNITED STATES PATENTS

| Number | Name | Date |
|---|---|---|
| 2,140,680 | Rhodes | Dec. 20, 1938 |
| 2,293,708 | Brown | Aug. 25, 1942 |
| 2,380,520 | Hassler | July 31, 1945 |
| 2,421,022 | Francis | May 27, 1947 |